United States Patent [19]

Geiger et al.

[11] Patent Number: 4,755,248
[45] Date of Patent: Jul. 5, 1988

[54] SLOT-CAST INTERGRATED INTERLOCKING FILM CLOSURE STRUCTURE

[75] Inventors: Herbert B. Geiger, Bay City; Donald L. Kain, Jr., Sebewaing, both of Mich.

[73] Assignee: The Dow Chemical Company, Midland, Mich.

[21] Appl. No.: 947,726

[22] Filed: Dec. 30, 1986

[51] Int. Cl.$^4$ .............................................. B32B 31/30
[52] U.S. Cl. .................................. 156/244.25; 24/576; 24/587; 156/66; 156/498; 156/500; 156/501; 264/177.1; 264/250; 383/63; 425/113
[58] Field of Search ................... 24/576, 587; 156/66, 156/244.11, 244.25, 498, 500, 501; 264/177 R, 259, 177.1, 250; 383/63; 425/111–113

[56] References Cited

U.S. PATENT DOCUMENTS

| | | | |
|---|---|---|---|
| Re. 29,208 | 5/1977 | Naito | 156/91 |
| 3,226,787 | 1/1966 | Ausnit . | |
| 3,338,284 | 8/1967 | Ausnit . | |
| 3,462,332 | 8/1969 | Goto | 156/498 X |
| 3,846,209 | 11/1974 | Howard | 156/502 |
| 3,852,386 | 12/1974 | Behr . | |
| 3,904,468 | 9/1975 | Noguchi | 156/498 X |
| 4,101,355 | 7/1978 | Ausnit | 156/66 |
| 4,279,677 | 7/1981 | Takahashi | 156/160 |
| 4,295,919 | 10/1981 | Sutrina et al. | 156/498 |
| 4,306,924 | 12/1981 | Kamp | 156/66 |
| 4,428,788 | 7/1984 | Kamp | 156/66 |
| 4,522,678 | 6/1985 | Zieke | 156/501 |
| 4,540,537 | 9/1985 | Kamp | 156/66 X |
| 4,555,282 | 11/1985 | Yano | 156/66 |
| 4,563,319 | 1/1986 | Ausnit et al. | 156/66 X |
| 4,582,549 | 4/1986 | Ferrell | 156/66 |
| 4,691,373 | 9/1987 | Ausnit | 156/66 X |
| 4,698,118 | 10/1987 | Takahashi | 156/66 X |

Primary Examiner—Robert A. Dawson

[57] ABSTRACT

A method and apparatus is disclosed for producing a reclosable bag film. The bag film is produced by extruding a bag film web having a relatively thinner first portion and relatively thicker second portions which are formed unitarily with the first portion. Closure members preferably in the form of male and female fastener profiles, are formed separately from the web portion and joined to the thicker second portions before the thicker second portions have become cooled to an ambient temperature.

11 Claims, 4 Drawing Sheets

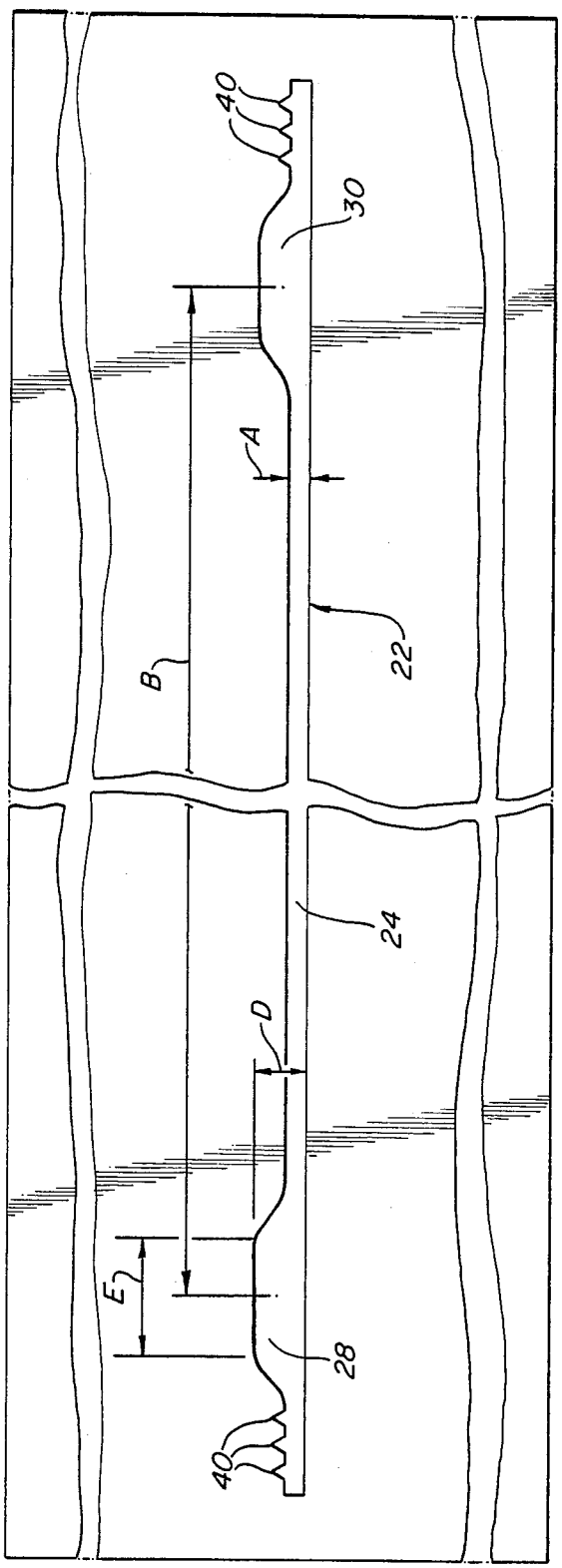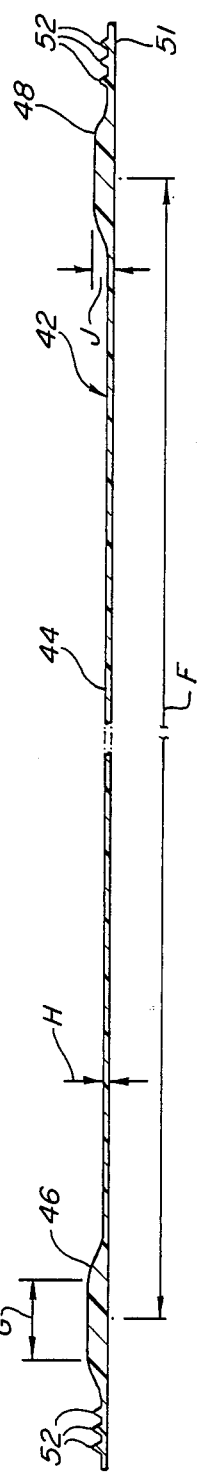

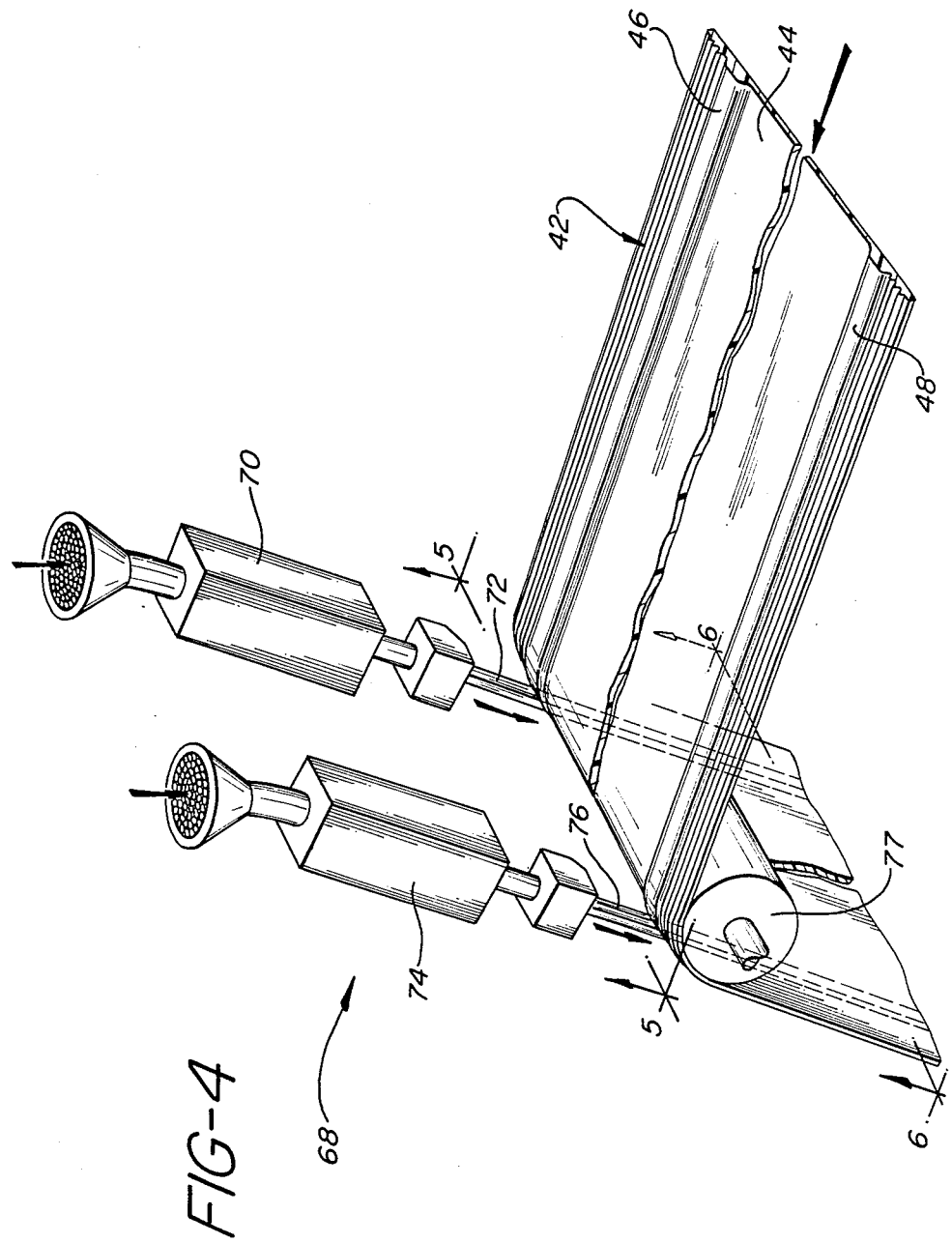

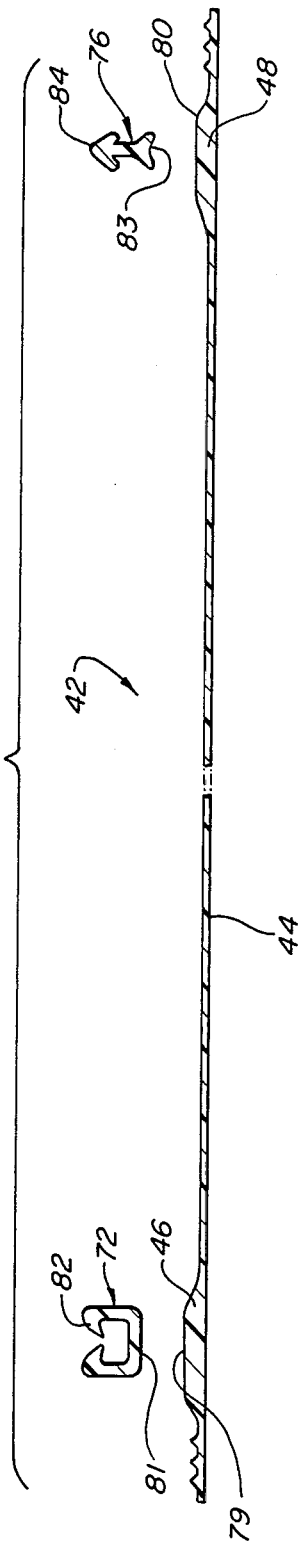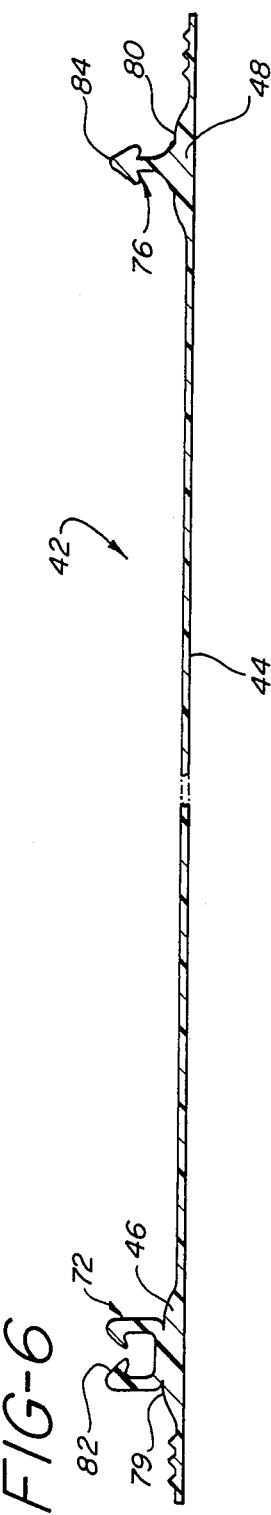

SLOT-CAST INTERGRATED INTERLOCKING FILM CLOSURE STRUCTURE

BACKGROUND OF THE INVENTION

The present invention relates to reclosable plastic bags, and more particularly to a method and apparatus for joining closure members to a bag film web, and the reclosable bag film formed thereby.

Reclosable plastic bags typically include a bag film web portion and a closure member portion. The bag film web portion generally consists of a pair of opposed planar plastic sheets which are sealed on three sides to form a bag body. The closure member portion extends along the fourth side of the plastic sheets and includes a female (or groove) fastener profile and a male (or rib) fastener profile. The closure members can be interlocked by the consumer to form a sealed container, and disengaged to permit the consumer to gain access to the interior of the bag. An example of such a reclosable bag is the ZIPLOC ® brand food storage bag manufactured by The Dow Chemical Company, the assignee of the instant invention.

One difficulty experienced by manufacturers of such reclosable bags involves the joining of the closure members to the bag film web portion. In order to produce a high-quality reclosable bag, care must be taken to ensure that the fastener elements are positioned properly on the bag film web. Further, there should be no wrinkles or creases in the area of the bag in which the fastener profiles and bag film web are joined.

Several approaches are described in the patent literature for forming reclosable bags. One approach has been to form the bag film web and the closure members in a single extrusion operation. See, e.g. Ansnit, U.S. Pat. Nos. 3,338,284; Behr, 3,852,386 (also assigned to the assignee of the instant invention), and Naito, Re. 29,208.

A second approach utilizes an adhesive, such as a strip of tape or glue, to join a closure member to a bag film web. For example, Ausnit U.S. Pat. No. 4,101,355 discloses a reclosable bag film forming process wherein a web and closure member are joined by a liquid adhesive which is supplied by an applicator having a nozzle. After the adhesive is applied, the web and closure members are pressed together by a presser roll and a backing roll. See also, Ausnit, U.S. Pat. No. 3,226,787.

A third approach involves the use of a pre-formed bag film web and a pre-formed closure member which are drawn from separate stock rolls. The bag film web and/or closure member are then heated and joined. For example, Howard, U.S. Pat. No. 3,846,209 discloses a method for producing a closure member-containing bag film wherein a pre-formed plastic film is fed from a stock roll into a sealing station. A separate closure strip from a second stock roll is also fed into the sealing station. In the sealing station, the closure strip and plastic film are welded together by a pair of heating bars.

A fourth approach wherein a pre-formed bag film web is drawn from a supply roll, and then joined to a relatively freshly extruded closure member, is disclosed in several patents. For example, Noguchi, U.S. Pat. No. 3,904,468 discloses a method of making a reclosable bag film wherein a web of bag film material is unwound from a stock roll and then transferred to a heating station having a heating roll on which the film is heated to a desired temperature. The film is then transferred to a heated joining roll wherein the film is joined to the freshly extruded fastener profile strips. See also, Takahashi, U.S. Pat. Nos. 4,279,677; and Ferrell, 4,582,549.

Another variation on this fourth approach is disclosed in Yano, U.S. Pat. No. 4,555,282. Yano discloses a method of bonding a closure member to a bag film web wherein a closure member having a base portion and a fastener profile portion is extruded shortly before being bonded to a bag film web. Intermediate the extrusion of the closure member and its joinder to the bag film web, the fastener profile portion of the closure member is cooled (and thereby solidified and stabilized) while the base portion is left heated (and thereby remains thermoplastic) when the closure member is joined to the film. Kamp, U.S. Pat. No. 4,306,924 discloses another variation on this fourth approach wherein the film web is extruded on to a casting roll to join an already formed closure member.

A fifth approach involves the extrusion of a bag film web and a closure member in close proximity to each other, and the joinder of the bag film web and closure member to each other shortly after extrusion. For example, Kamp U.S. Pat. No. 4,428,788 discloses a method for forming a reclosable bag wherein a film, a tape, and a closure member are extruded by three separate dies. The film, tape and closure member dies are positioned so that the film, tape and closure members contact each other while still at a temperature of above 200° F. A chill roll is provided for cooling the film, tape and closure members. Sutrina et al, U.S. Pat. No. 4,295,915, which is assigned to the same assignee as the instant invention, discloses to an apparatus for forming a reclosable bag film wherein a fastener profile and its base strip are extruded integrally, and then joined to a film web. The die for extruding the bag film web is disposed adjacent to the fastener die block so that the fastener profile and bag film are joined shortly after both are extruded. See also Goto, U.S. Pat. Nos. 3,462,332 and Zieke, 4,522,678.

Although the above discussed patents all disclose various methods for forming reclosable bags, room for improvement exists in the fabrication of a reclosable bag which can be manufactured to consistently high quality standards. Accordingly, it is an object of the present invention to provide a method and apparatus which can produce high quality reclosable bag film webs consistently.

SUMMARY OF THE INVENTION

In accordance with the present invention, a plastic bag film is provided for producing a reclosable bag. The plastic bag film comprises a film web which includes a relatively thinner first portion having relatively lesser heat retention properties and relatively thicker second portions. The second portions are formed unitarily with the first portion and have relatively greater heat retention properties than the first portion. The closure members are formed separately from said web portion and are joined to the second portions of the web before the second portions become cooled to an ambient temperature.

Additionally, a method is disclosed for forming a reclosable bag which comprises extruding a bag film web including a relatively thinner first portion having relatively lesser heat retention properties and relatively thicker second portions having relatively greater heat retention properties. The closure members are extruded and applied to the second portions before the second portions have cooled to an ambient temperature. The bag film web (which now has the closure members joined thereto) is then cooled.

Further, an apparatus is provided for producing the bag film. The apparatus comprises a first extrusion means including a generally continuous extrusion slot having a relatively thinner first portion and relatively thicker second portions for extruding a bag film web having a relatively thinner first portion and relatively thicker second portions. A second extrusion means is provided which includes an extrusion slot for extruding a fastener profile and a joining means positioned for joining the fastener profile to a second portion of the bag film web before the second portion has cooled to an ambient temperature.

One feature of the present invention is that the thickened portion of the bag film web retains considerable residual heat at the time when the fastener profile is applied. This retained residual heat has the advantage of facilitating the adhesion of the freshly extruded fastener profile to the bag film by reducing the energy required to soften the thickened portion sufficiently to achieve a fusion between the fastener profile and the thickened portion.

Another feature of the present invention is that as the fastener profile is extruded separately from the bag film web, the material used for the fastener profile can be different than the material used for the bag film web. This feature has the advantage of providing a manufacturer with greater flexibility in his choice of materials. Thus, the choice of material for use with a bag film web is not constrained by material requirements imposed by the closure member.

These and other features of this invention and their inherent advantages will become apparent to those skilled in the art from the following description of preferred embodiments and the accompanying drawings illustrating the best mode of carrying out the invention.

BRIEF DESCRIPTION OF THE DRAWINGS

FIG. 2 is an end view of an extrusion die block for extruding a bag film web of the present invention;

FIG. 3 is a sectional view of the bag film web of the present invention;

FIG. 4 is a perspective view of the closure member extrusion and joining station of the present invention;

FIG. 5 is a sectional view taken along lines 5—5 of FIG. 4, and

FIG. 6 is a sectional view taken along lines 6—6 of FIG. 4.

DETAILED DESCRIPTION OF THE PREFERRED EMBODIMENTS

Figure 1:
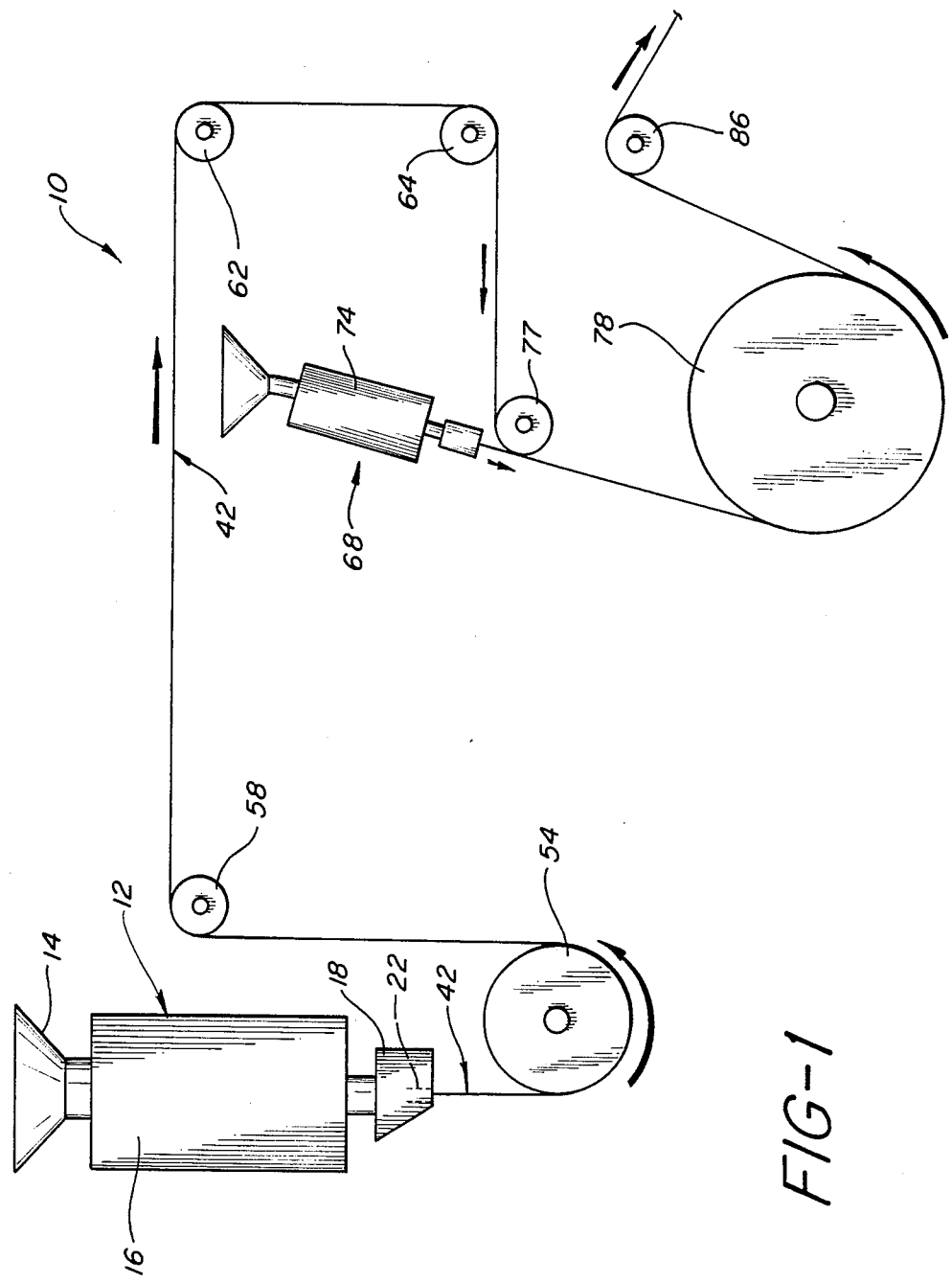
FIG. 1 is a schematic view of the reclosable bag forming apparatus of the present invention.

An apparatus 10 is shown in FIG. 1 for producing a reclosable bag film by the method of the present invention. The apparatus 10 includes an extruder 12 for extruding a bag film web. The extruder 12 includes a hopper 14 for receiving plastic material, a body 16 which contains a heating means (not shown) for heating the plastic material into a molten state, and a screw auger (not shown) for advancing the molten material to and through die block 18. The die block 18 and the film extruded from the die block 18 are best shown in FIGS. 2 and 3 respectively. The die block 18 includes a generally continuous die slot 22 having a relatively thinner first portion 24 and a pair of relatively thicker second portions 28 and 30 disposed at either end of the relatively thinner portion 24. The first portion 24 and second portions 28 and 30 each have a generally contoured crossection.

Preferably, the first portion 24 generally has a thickness A of between about 0.020 and 0.040 inches and a width B generally equal to slightly more than twice the height of the body portion of a finished bag assembly (not shown).

Preferably, the thickness D of the second portions 28, 30 is between about 0.030 and 0.080 inches, and preferably about 0.045 inches. The ratio of thickness of the second portions 28, 30 to the first portion 24 (D:A) may be in the range of between about 1.5:1 and 2:1 and preferably about 1.75:1. The width E of the second portions is preferably in the range of between about 0.75 and 1.25 inches each and preferably about 1.0 inch. The adjacent surfaces 38 of each of the second portions 28, 30 may contain a plurality of grooves 40, the purpose of which will be explained below.

The bag film web 42 extruded from the die block 18 is shown in FIG. 3 as having a crossectional shape similar to the crossectional shape of the die slot 22 from which the bag film web 42 is extruded. The bag film web 42 includes a relatively thinner first portion 44 which is extruded from the relatively thinner first portion 24 of the die slot 22, and a pair of relatively thicker second portions 46 and 48 which are extruded respectively from the relatively thicker second portions 28 and 30 of the die slot 22. Typically, the thickness H of the first portion 44 will be between about 0.001 and 0.003 inches and the thickness J of the second portions 46, 48 will be between about 0.003 and 0.008 inches, depending on the type of bag being made from the bag film web 42. The ratio of the thickness J of the second portions 46, 48 to the thickness H of the first portion 44 can be in the range of between about 1.3:1 and 8:1, and preferably is about 3:1. The width F of the first portion 44 and the width G of the second portions 46, 48 are slightly less than the widths B, E of the respective first and second portions 24 and 28, 30, of the die slot 22.

The thickness H of the first portion 44 and the thickness J of the second portions 46 and 48 of the bag film web 42 are considerably less than the respective thicknesses A and E of the die slot 22. The thicknesses H and J are typically much less than the thickness of the respective first and second portions of the die slot 22. This reduction in thickness is due to the fact that a 10:1 to 30:1 draw down ratio is typically utilized in the manufacture of reclosable plastic bags. It will be appreciated that the exact draw down ratio utilized for the production of any particular reclosable bag is often a matter of choice, with the choice being dictated by the characteristics desired of the bag so formed. For example, a higher draw down ratio (e.g. 30:1) might be used for the production of a bag film web for 0.001 inch thick sandwich bags from a 0.030 inch thick die slot, whereas a lower draw down ratio (e.g. 10:1) could be used for the production of 0.003 inch thick freezer bags from the same 0.030 inch die slot.

The adjacent surface 51 of the second portions 46, 48 of bag film web 42 contains a plurality of parallel, raised ridges 52, which are formed by the grooves 40 in die slot 22. In the finished bag assembly, these ridges 52 serve as engaging means for aiding the user in disengaging the fastener profiles.

Referring now to FIG. 1, the film web 42 emerges from die block 18 and passes around a driven rotatable casting roll 54. The casting roll 54 drives the web 42 along its path and aids in the cooling of the bag film web 42. The casting roll 54 can cool the first portion 44 and second portions 46, 48 below their crystallization points. Notwithstanding this crystallization, the relatively thicker second portions 46, 48, will still retain substantial residual heat after emerging from the casting roll 54 due to their relatively lower surface to volume ratio as compared to the thinner first portion 44. The amount of cooling imparted by the casting roll 54 to the bag film web 42 is related to the temperature of the perimetrical surface of the casting roll 54 and the amount of time the bag film web 42 is in contact with the casting roll 54. The size chosen for the casting roll 54 used should be large enough to foster the solidification of the first portion 44 of the bag film web, yet small enough so as not to cool the second portions 46, 48 to an ambient temperature.

The bag film web 42 then passes around idler rollers 62 and 64 and travels to a closure member extrusion and joining station 68. The extrusion and joining station 68 is best shown in FIG. 4 as including a first extruder 70 for extruding a female fastener profile 72, and a second extruder 74 for extruding a male fastener profile 76. As the fastener profiles 72, 76 are extruded separately from the bag film web 42, it will be appreciated that the fastener profiles 72 and 76 need not be formed of the same material as the bag film web 42. For example, the fastener profiles 72, 76 can be extruded from a first polyethylene material, and the bag film web 42 from a second different polyethylene material. As the desired characteristics of the material chosen for the bag film web 42 may be different than the characteristics desired of the material and for the fastener profiles 72, 76, the separate extrusion provided by the instant invention permits the manufacturer to optimize his choice of materials for each of the bag film web 42 and fastener profiles 72, 76 without being forced to choose a "compromise" material having some characteristics desirable for a bag film web and some characteristics desirable for a closure member.

As shown in FIG. 4, the female and male fastener profiles 72, 76 are also extruded separately from each other. Thus, if so desired, the manufacturer can also choose to make the two fastener profiles 72, 76 from different materials. Alternately, the fastener profiles 72, 76 can be produced from a single extruder (not shown) having a pair of spaced die slots for extruding the fastener profiles 72, 76. The shape of the extruded fastener profiles 72, 76 is best shown in FIG. 5.

After emerging from their extruders 70, 74 the fastener profiles 72, 76 are joined to the upper surfaces 79, 80 of the thicker second portions 46, 48 of the bag film web 42 as the bag film web 42 passes around a idler roller 77. The positioning of the path of travel the bag film web 42, the extruder and the idler roller 77 ensure that the fastener profiles 72, 76 are properly aligned on the respective thicker second portions 46, 48 of the bag film web 44. Due to the relatively short distance between the die slot of the extruders 70, 74 and the point at which the fastener profiles 72, 76 engage the second portions 46, 48 of the bag film web 42, the fastener profiles 72, 76 will generally maintain their proper rotational alignment to ensure that the lower surface 81 of female fastener profile 72 will be engaged with the upper surface 79 of the thickened second portion 46, and the open upper end 82 of the female fastener profile 72 will face away from upper surface 79. Similarly, the lower surface 83 of the tail of the male fastener profile 76 will be engaged with the upper surface 80 of thickened second portion 48, and the apex 84 of the male fastener profile 76 will point away from upper surface 80.

The heat of the freshly extruded fastener profiles 72, 76 helps to fuse the fastener profiles to the second portions 46, 48 of the bag film web 42. As discussed above, the relatively greater thickness of the second portions 46, 48 causes them to cool much more slowly than the thinner first portion 44, which, by the time it 44 reaches the closure and joining station 68 may be cooled to an ambient temperature. Thus, when the fastener profiles 72, 76 are joined to the thicker second portions 46, 48, the thickened second portions 46, 48 have still retained considerable residual heat, and have not yet cooled to an ambient temperature. This residual heat facilitates the fusion of the fastener profiles 72, 76 to the thickened second portions 46, 48. Any additional heat which may be necessary to cause the fusion between the fastener profiles 72, 76 and the thickened second portions 46, 48 is provided by the heat of the freshly extruded closure members 72, 76. Without this residual heat, it is likely that a poor bond would be formed between the fastener profiles 72, 76 and the second portions 46, 48.

A chilled casting roll 78 is positioned in the path of travel of the bag film web 42 to engage the bag film web 42 shortly after the fastener profiles 72, 76 are joined to the bag film web 42. The coolness of the chilled casting roll 78 causes the thickened second portions 46, 48 and fastener profiles 72, 76 to become substantially solidified, thus cementing the bond between the second portions 46, 48 and the fastener profiles 72, 76, and maintaining the fastener profiles 72, 76 and the second portions 46, 48 in their proper conformation. A cooling fluid can be passed through the casting roll 78 to maintain the outer surface of the casting roll at a desired temperature.

After passing around the chilled casting roll 78, the film web 42 can pass around a series of idler and drive rollers, such as rollers 86, to transport the web 42 to its desired location.

Thus, an apparatus and method for forming a bag film web is provided wherein the bag film web 42 and fastener profiles 72, 76 are separately formed to permit the manufacturer to optimize his choice of materials. Further, the method and apparatus of the present invention provides for a reclosable bag film web 42 having fastener profiles 72, 76 which are well bonded and properly aligned on the bag film web 42.

Having described the invention in detail and by reference to preferred embodiments thereof, it will be apparent that modifications and variations are possible without departing from the scope of the invention defined in the appended claims.

What is claimed is:

1. A method for forming plastic bag film for reclosable plastic bags comprising
    extruding a bag film web including a relatively thinner first portion having relatively lesser heat retention properties and a relatively thicker second portion having relatively greater heat retention properties,
    extruding a closure member, joining said closure member to said thicker second portion before said thicker second portion has cooled to an ambient temperature, and cooling said closure member and bag film.

2. The method of claim 1 wherein said step of extruding a bag film web comprises the step of extruding said bag film web with a slotted extrusion die having a relatively thinner first portion through which said first portion of said web is extruded and a relatively thicker second portion through which said second portion of said bag film web is extruded.

3. The method of claim 2 wherein said relatively thinner first portion of said extrusion die has a thickness of between about 0.020 and 0.040 inches and said relatively thicker second portion has a thickness of between about 0.030 and 0.080 inches.

4. The method of claim 1 wherein the step of extruding said bag film web comprises the step of extruding a bag film web having said first portion being between about 0.001 and 0.003 inches thick and said second portion being between about 0.003 and 0.008 inches thick.

5. The method of claim 1 wherein said step of cooling said closure member containing bag film comprises the step of passing said closure member containing bag film over a cooled casting roller.

6. An apparatus for producing an integrated bag film having a closure member comprising:

a first extrusion means including a generally continuous extrusion slot having a relatively thinner first portion and a relatively thicker second portion for extruding a bag film web having a relatively thinner first portion and a relatively thicker second portion, a second extrusion means including an extrusion slot for extruding a closure member, and joining means positioned for joining said closure member to said second portion of said bag film web before said second portion has become cooled to an ambient temperature.

7. The apparatus of claim 6 wherein said first extrusion means comprises a slotted die, said first portion of said slotted die being generally rectangular in cross section and having a thickness of between about 0.020 and 0.040 inches, and said second portion of said slotted die being generally contoured in crossection and having a thickness of between about 0.030 and 0.080 inches and a width of between about 0.75 and 1.25 inches.

8. The apparatus of claim 7 wherein the ratio of the thickness of said second portion and said first portion of said slotted die is between about 1.5:1 and 2:1.

9. The apparatus of claim 6 further comprising a first casting roll means around which the bag film web is passed before said bag film web encounters said joining means, and wherein said joining means comprises a roller means positioned for receiving said bag film web and said closure member in a properly aligned relation and a chilled coating roll for cooling said closure member and said second portion of said bag film web to cause said closure member and second portio to become fused together.

10. A method for forming plastic bag film for reclosable plastic bags comprising the steps of, extruding a bag film web having at least one portion thereof which is thicker than the remainder of said web and having relatively greater heat retention properties than the remainder of said web, applying a closure member to said thicker portion of said web before said thicker portion has cooled to an ambient temperature, and cooling said closure member and bag film.

11. An apparatus for producing an integrated bag film having a closure member joined thereto comprising:

a first extrusion die, including a generally continuous extrusion slot having at least one portion thereof with a cross-section wider than the remainder of said extrusion slot for extruding a bag film web having at least one portion thereof thicker than the remainder of said web, and joining means positioned for joining a closure member to said thicker portion of said bag film web before said thicker portion has cooled to an ambient temperature.

* * * * *